(12) United States Patent
Kano et al.

(10) Patent No.: US 11,904,808 B2
(45) Date of Patent: Feb. 20, 2024

(54) INFORMATION PROCESSING APPARATUS, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Hirokazu Kano, Nagoya (JP); Masatoshi Hayashi, Nisshin (JP); Reita Kamei, Nagoya (JP); Namika Hara, Kameyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 17/332,214

(22) Filed: May 27, 2021

(65) Prior Publication Data

US 2021/0370872 A1 Dec. 2, 2021

(30) Foreign Application Priority Data

Jun. 1, 2020 (JP) ................................. 2020-095626

(51) Int. Cl.
*B60R 25/24* (2013.01)

(52) U.S. Cl.
CPC ........ *B60R 25/24* (2013.01); *B60R 2325/205* (2013.01)

(58) Field of Classification Search
CPC .......................... B60R 25/24; B60R 2325/205
See application file for complete search history.

(56) References Cited

U.S. PATENT DOCUMENTS

| | | | |
|---|---|---|---|
| 10,437,977 B2* | 10/2019 | Lambert | H04W 12/082 |
| 2015/0070135 A1 | 3/2015 | Ford | |
| 2015/0321640 A1* | 11/2015 | Hisada | B60R 25/1004 340/426.2 |
| 2015/0371153 A1* | 12/2015 | Lohmeier | G06Q 40/08 705/5 |
| 2019/0001926 A1* | 1/2019 | Arakawa | B60R 25/241 |
| 2019/0106084 A1* | 4/2019 | Matsuyama | B60R 25/24 |
| 2019/0122469 A1 | 4/2019 | Fujiwara | |
| 2019/0180220 A1* | 6/2019 | Kaneichi | G01C 21/3438 |
| 2019/0184939 A1 | 6/2019 | Hioki et al. | |
| 2019/0189011 A1 | 6/2019 | Yanagida et al. | |
| 2019/0291695 A1 | 9/2019 | Suda et al. | |

(Continued)

FOREIGN PATENT DOCUMENTS

| | | |
|---|---|---|
| CN | 103959346 A | 7/2014 |
| CN | 109933972 A | 6/2019 |

(Continued)

*Primary Examiner* — Thomas D Alunkal
(74) *Attorney, Agent, or Firm* — Sughrue Mion, PLLC (57) ABSTRACT

The present disclosure causes security at the time of transferring a vehicle to be improved, in a vehicle system using an electronic key. The present disclosure relates to an information processing apparatus capable of communicating with a vehicle configured to perform authentication for a mobile apparatus based on an electronic key acquired from the mobile apparatus. Use situations of the electronic keys issued to the two or more mobile apparatuses are acquired; and the authentication performed for any of the two or more mobile apparatuses is invalidated when the use situations satisfy predetermined conditions.

11 Claims, 8 Drawing Sheets

(56) References Cited

U.S. PATENT DOCUMENTS

| | | | |
|---|---|---|---|
| 2020/0007338 A1* | 1/2020 | Oh | ................... H04L 9/008 |
| 2020/0059359 A1 | 2/2020 | Sugano | |
| 2020/0156591 A1* | 5/2020 | Arakawa | ............ B60R 25/209 |

FOREIGN PATENT DOCUMENTS

| | | |
|---|---|---|
| JP | 2007-77692 A | 3/2007 |
| JP | 2017-84394 A | 5/2017 |
| JP | 2018-195932 A | 12/2018 |
| JP | 2019-77338 A | 5/2019 |
| JP | 2019-109867 A | 7/2019 |
| JP | 2019-163677 A | 9/2019 |

* cited by examiner

RECORD DATA

| DATE AND TIME | TERMINAL ID | APPARATUS ID | KEY ID | AUTHENTICATION RESULT |
|---|---|---|---|---|
| ... | T001 | D001 | K001 | ... |
| ... | T001 | D001 | K001 | ... |
| ... | T002 | D002 | K002 | ... |
| ... | T002 | D002 | K002 | ... |
| ... | ... | ... | ... | ... |
|  |  |  |  |  |

Fig. 7

INFORMATION PROCESSING APPARATUS, INFORMATION PROCESSING METHOD AND NON-TRANSITORY STORAGE MEDIUM

CROSS REFERENCE TO THE RELATED APPLICATION

This application claims the benefit of Japanese Patent Application No. 2020-095626, filed on Jun. 1, 2020, which is hereby incorporated by reference herein in its entirety.

BACKGROUND

Technical Field

The present disclosure relates to an information processing apparatus that uses an electronic key.

Description of the Related Art

Automobiles capable of performing locking/unlocking by a mobile terminal are increasing.

Conventionally, it has been sufficient only to hand over a physical key at the time of transferring an automobile. In the case of changing the owner of an automobile using an electronic key, however, the necessity of appropriately managing the electronic key occurs. In connection with this, Japanese Patent Laid-Open No. 2018-195932 discloses a system for, in the case of changing the owner of a vehicle, changing a cryptography key that the vehicle uses.

[Patent document 1] Japanese Patent Laid-Open No. 2018-195932

SUMMARY

However, when a key is not changed at the time of transferring a vehicle, and an old owner does not erase the electronic key, then a problem occurs that the old owner can access the vehicle.

The present disclosure has been made in consideration of the above problem, and one or more aspects are directed to improve security at the time of transferring a vehicle in a vehicle system using an electronic key.

An information processing apparatus according to a first aspect of the present disclosure may be an information processing apparatus capable of communicating with a vehicle configured to perform authentication for a mobile apparatus based on an electronic key acquired from the mobile apparatus, the information processing apparatus comprising a controller including at least one processor configured to execute: acquiring use situations of electronic keys issued to two or more mobile apparatuses; and invalidating the authentication performed for any of the two or more mobile apparatuses when the use situations satisfy predetermined conditions.

An information processing apparatus according to a second aspect of the present disclosure may be an information processing apparatus capable of communicating with a vehicle configured to perform authentication for a mobile apparatus based on an electronic key acquired from the mobile apparatus, the information processing apparatus comprising a controller including at least one processor configured to execute: judging an operation base of the vehicle based on position information about the vehicle; and invalidating the authentication performed for a first mobile apparatus with a record of having been used in a first area when judging that the operation base of the vehicle has moved from the first area to a second area.

An information processing apparatus according to a third aspect of the present disclosure may be an information processing method implemented by an information processing apparatus capable of communicating with a vehicle configured to perform authentication for a mobile apparatus based on an electronic key acquired from the mobile apparatus, the information processing method comprising the steps of: acquiring use situations of electronic keys issued to two or more mobile apparatuses; judging an operation base of the vehicle based on position information about the vehicle; and invalidating the authentication performed for at least any of the two or more mobile apparatuses when the use situations satisfy predetermined conditions, or when judging that that the operation base of the vehicle has moved from a first area to a second area.

As other aspect, a computer-readable storage medium in which a program is non-temporarily stored for causing a computer to execute the above information processing method is given.

According to the present disclosure, it is possible to improve security at the time of transferring a vehicle in a vehicle system using as electronic key.

DESCRIPTION OF THE EMBODIMENTS

An information processing apparatus according to one aspect of the present disclosure may be an apparatus capable of communicating with a vehicle capable of performing locking/unlocking with an electronic key.

Specifically, the information processing apparatus may be characterized in including a controller configured to execute: acquiring use situations of electronic keys issued to two or more mobile apparatuses; and invalidating authentication performed for at least any of the two or more mobile apparatuses when the use situations satisfy predetermined conditions.

The mobile apparatus is an apparatus that is authenticated by a vehicle with an electronic key. The mobile apparatus may be a small-size computer (a mobile terminal) such as a smartphone or may be an IC card or the like. The vehicle authenticates the mobile apparatus by the electronic key and performs locking/unlocking of a door, engine start control and the like based on a result of the authentication.

The controller acquires use situations of electronic keys issued to two or more mobile apparatuses. The use situations of the electronic keys may be acquired from mobile apparatuses or may be acquired from the vehicle. Further, the electronic keys issued to the plurality of mobile apparatuses may be the same or may be mutually different. Further, the controller invalidates the authentication performed for at least any of the plurality of mobile apparatuses when the use situations of the electronic keys satisfy predetermined conditions.

For example, when a mobile apparatus that transmits an electronic key to a vehicle changes at a certain time point, it can be presumed that the owner of the vehicle has changed. Further, when a plurality of electronic keys has been issued, and an electronic key used to unlock a vehicle has changed at a certain time point, it is similarly presumed that the owner of the vehicle has changed. In such cases, the information processing apparatus takes a measure for preventing the mobile apparatus associated with an old owner from performing authentication.

According to such a configuration, it is possible to prevent access to a vehicle by an old owner when the vehicle is transferred.

Note that the information processing apparatus may be an apparatus that performs overall control of a plurality of vehicles or may be a component of each vehicle. When the information processing apparatus is a component of the vehicle, the information processing apparatus may include the function of performing authentication.

The information processing apparatus may be characterized in that the two or more mobile apparatuses include a first mobile apparatus; and when there are no use records of a first electronic key issued to the first mobile apparatus in a past first period, the controller invalidates the first electronic key.

The information processing apparatus may be characterized in that the two or more mobile apparatuses further include a second mobile apparatus; and, when, in the first period, there are no use records of the first electronic key, and there is a use record of a second electronic key issued to the second mobile apparatus, the controller invalidates the first electronic key.

The information processing apparatus may be characterized in that, when, in the first period, there are no use records of the first electronic key, and there is a use record of the second electronic key; and, in the second period before the first period, there is a use record of the first electronic key, and there are no use records of the second electronic key, the controller invalidates the first electronic key.

In other words, the first electronic key may be invalidated when any of the following applies: (1) the first electronic key is not used in the past first period; (2) in the first period, the first electronic key is not used, but the second electronic key is used instead; (3) the electronic key used has changed from the first electronic key to the second electronic key.

This is because, in such cases, it can be presumed that a vehicle has been transferred from a user using the first electronic key to a user using the second electronic key.

The information processing apparatus may be characterized in that the controller invalidates the first electronic key by deleting authentication information corresponding to the first electronic key from the vehicle.

According to such a configuration, it is possible to invalidate only the first electronic key.

The information processing apparatus may be characterized in that the two or more mobile apparatuses include a first mobile apparatus; and, when there are no use records of the electronic key by the first mobile apparatus in a past first period, the controller invalidates the authentication performed for the first mobile apparatus.

The information processing apparatus may be characterized in that the two or more mobile apparatuses further include a second mobile apparatus; and, when, in the first period, there are no use records of the electronic key by the first mobile apparatus, and there is a use record of the electronic key by the second mobile apparatus, the controller invalidates the authentication performed for the first mobile apparatus.

The information processing apparatus may be characterized in that, when, in the first period, there are no use records of the electronic key by the first mobile apparatus, and there is a use record of the electronic key by the second mobile apparatus; and, in a second period before the first period, there is a use record of the electronic key by the first mobile apparatus, and there are no use records of the electronic key by the second mobile apparatus, the controller invalidates the authentication performed for the first mobile apparatus.

When mutually different electronic keys are not issued to a plurality of mobile apparatuses, invalidation of authentication may be performed not using use records of electronic keys as described above but use records of the mobile apparatuses. In other words, the authentication performed for the first mobile apparatus may be invalidated when any of the following applies: (1) the first mobile apparatus is not used in the past first period; (2) in the first period, the first mobile apparatus is not used, but the second mobile apparatus is used instead; (3) the mobile apparatus used has chanced from the first mobile apparatus to the second mobile apparatus.

Further, the information processing apparatus may be characterized in that, when performing a process of issuing the electronic keys to the two or more mobile apparatuses and deciding to invalidate the authentication performed for the first mobile apparatus, the controller stops issue of the electronic key to the first mobile apparatus.

As one of methods for invalidating authentication in a case where an electronic key is not permanent (for example, in the case of a one-time key), there is a method of stopping issue of an electronic key for a target mobile apparatus.

The information processing apparatus may be characterized in that, when deciding to invalidate the authentication performed for the first mobile apparatus, the controller causes the vehicle to refuse access from the first mobile apparatus.

For example, by blocking connection from a mobile apparatus based on information specific to the mobile apparatus, such as a terminal identification number, a telephone number, a hardware identifier and a physical network address, authentication can be invalidated.

Further, an information processing apparatus according to a different aspect of the present disclosure may be characterized in including a controller configured to execute: judging an operation base of the vehicle based on position information about the vehicle; and invalidating the authentication performed for a first mobile apparatus with a record of having been used in a first area when judging that the operation base of the vehicle has moved from the first area to a second area.

It is possible to presume that an operation base of a vehicle has changed, based on position information about the vehicle. Further, when the operation base of the vehicle has changed, it can be presumed that the vehicle has been transferred. Furthermore, it can be presumed that a first mobile apparatus that has been used in a previous area is an apparatus associated with an old owner. Therefore, by invalidating authentication for the first mobile apparatus, security can be secured.

The information processing apparatus may be characterized in that the controller invalidates the authentication on condition that consent is obtained from a user of the vehicle.

By asking a user whether a vehicle has been transferred, it is possible to prevent a mobile apparatus or an electronic key that may be used from being refused.

Embodiments of the present disclosure will be described below based on drawings. Configurations of the embodiments below are mere examples, and the present disclosure is not limited to the configurations of the embodiments.

First Embodiment

An outline of an authentication system according to a first embodiment will be described with reference to FIG. 1. The system according to the present embodiment is configured, including a server apparatus 100, mobile terminals 200 that users possess, and an onboard apparatus 300 installed in a vehicle.

In the system according to the present embodiment, the server apparatus 100 issues an electronic key to a mobile terminal 200. The mobile terminal 200 transmits the electronic keys to the onboard apparatus 300 to request authentication. The onboard apparatus 300 executes authentication of the mobile terminal 200 using the electronic key. When the authentication is successful, locking/unlocking of a door and engine start become possible.

In the present embodiment, a case where a vehicle in which the onboard apparatus 300 is installed is transferred from an old user to a new user is assumed to make a description. A mobile terminal owned by the old user of the vehicle is assumed to be a mobile terminal 200A, and a mobile terminal owned by the new user is assumed as a mobile terminal 200B. The mobile terminal 200A is also referred to as an old terminal, and the mobile terminal 200B is also referred to as a new terminal.

In the case of transferring the vehicle, it is necessary to erase an electronic key from the old terminal and store a newly issued electronic key into the new terminal. When this is not done, however, a trouble occurs that access to the vehicle by the old terminal remains possible.

In order to cope with this, in the system according to the present embodiment, the server apparatus 100 monitors a use situation of the electronic key, and, when it is presumed that transfer of the vehicle has been performed, authentication for the old terminal by the onboard apparatus 300 is invalidated.

Components of the system will be described in detail.

Figure 1:
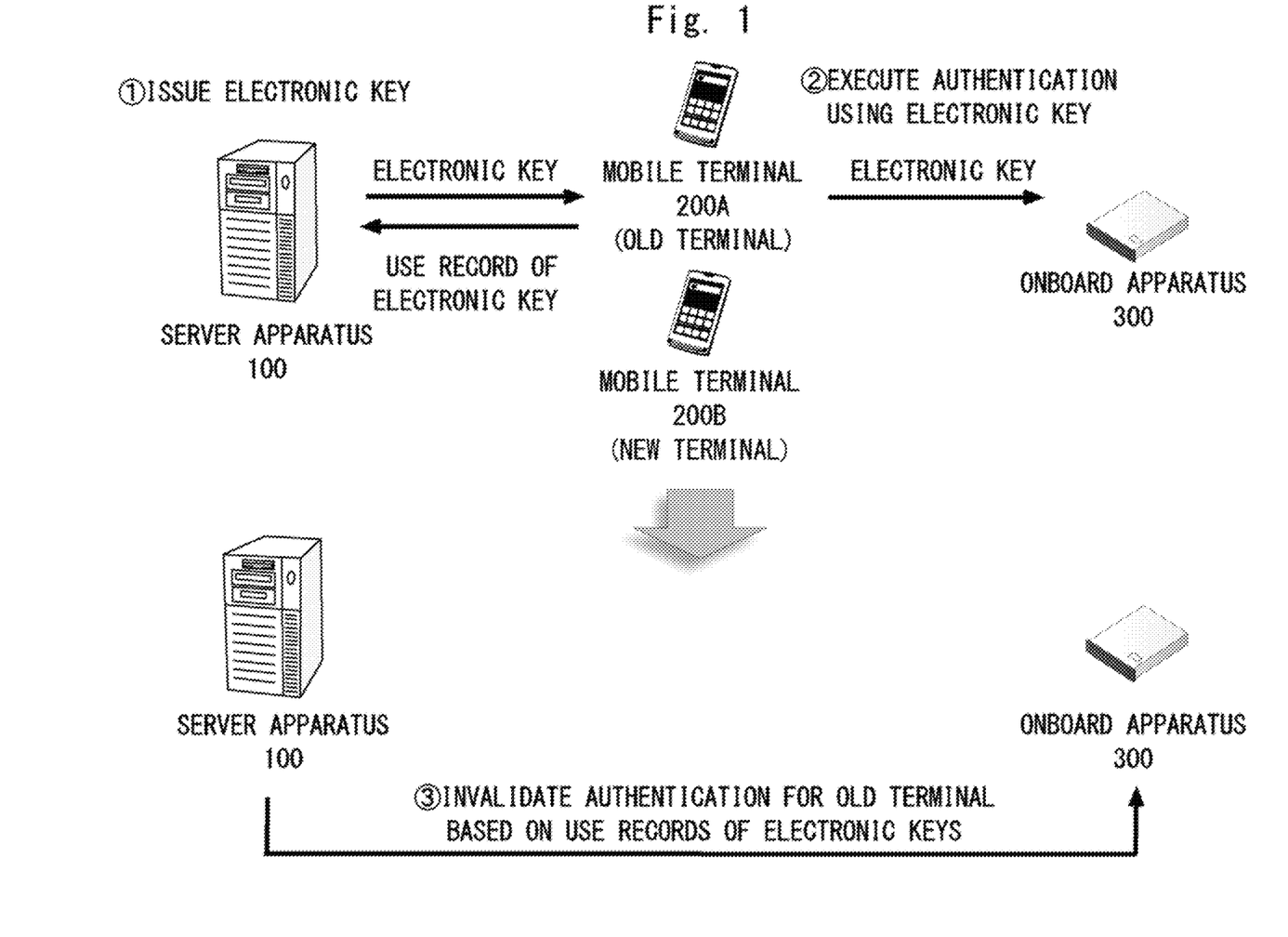
FIG. 1 is a schematic diagram of an authentication system according to a first embodiment.
Figure 2:
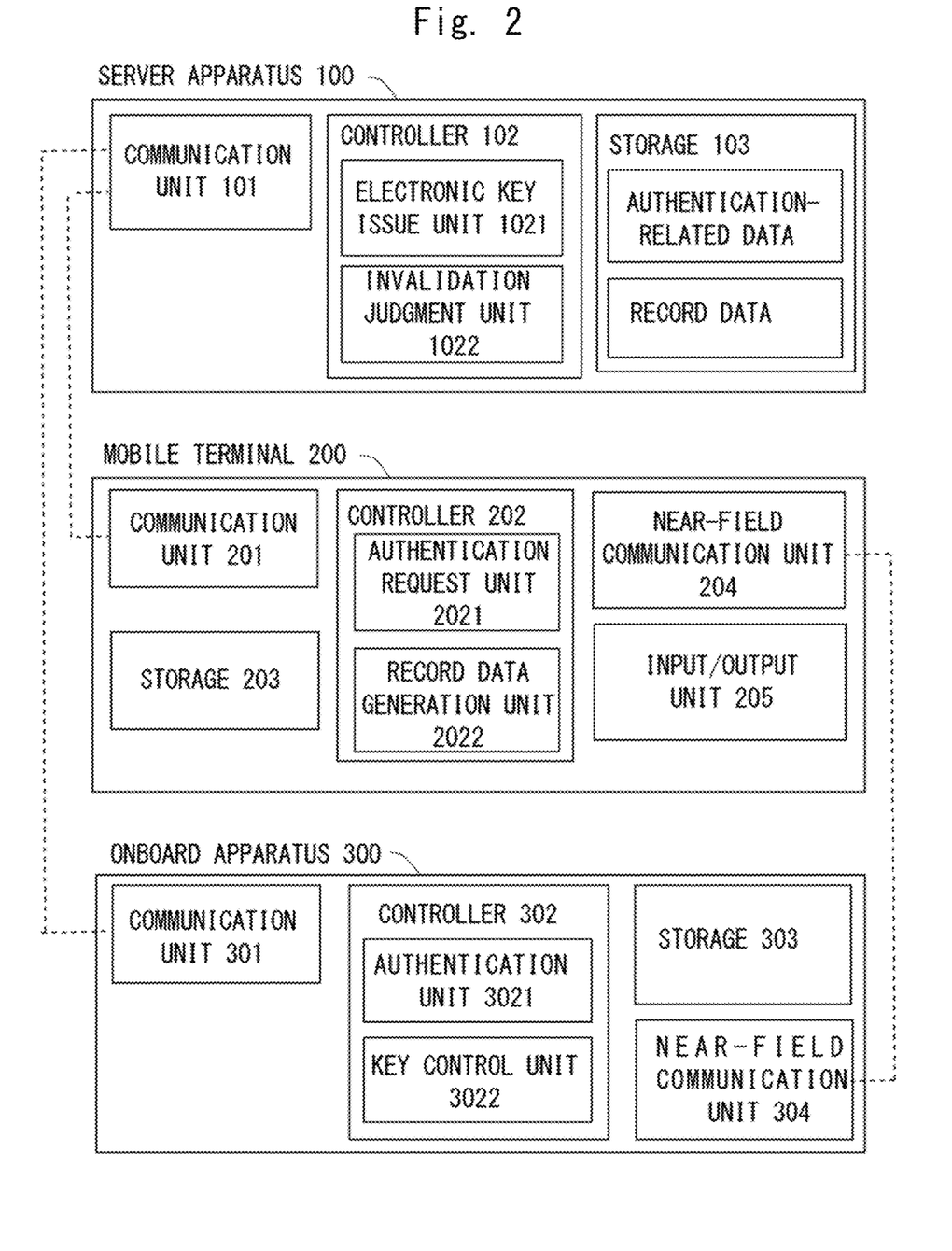
FIG. 2 is a block diagram schematically illustrating an example of components included in the system.

FIG. 2 is a block diagram schematically illustrating an example of configurations of the server apparatus 100, each mobile terminal 200 and the onboard apparatus 300 illustrated in FIG. 1.

The server apparatus 100 is an apparatus that issues an electronic key in response to a request from the mobile terminal 200. The server apparatus 100 also acquires records of use of electronic keys key the mobile terminals 200 and performs an electronic key invalidation process based on the use records.

The server apparatus 100 can be configured with a general-purpose computer. In other words, the server apparatus 100 can be configured as a computer that includes processors such as a CPU and a GPU, main memories such as a RAM and a ROM, auxiliary storage devices such as an EPROM, a hard disk drive and a removable medium. Note that the removal medium may be, for example, a USB memory or a disk recording medium such as a CD or a DVD. In the auxiliary storage devices, an operating system (OS), various kinds of programs, various kinds of tables and the like are stored. By executing a program stored therein, each of functions corresponding to predetermined purposes as described later can be realized. However, a part or all of the functions may be realized by a hardware circuit such as an ASIC or an FPGA.

The server apparatus 100 is configured, including a communication unit 101, a controller 102 and a storage 103.

The communication unit 101 is communication means for connecting the server apparatus 100 to a network. In the present embodiment, the communication unit 101 is capable of performing communication with the mobile terminals 200 and the onboard apparatus 300 via the network using a mobile communication services such as 4G and LTE.

The controller 102 is means for controlling the server apparatus 100. The controller 102 is configured, for example, with a CPU.

The controller 102 includes an electronic key issue unit 1021 and an invalidation judgment unit 1022 as functional modules. Each of the functional modules may be realized by executing a program stored in storage means such as the ROM by the CPU.

The electronic key issue unit 1021 issues an electronic key in response to a request from a mobile terminal 200. The electronic key is digital data for the mobile terminal 200 to receive authentication from the onboard apparatus 300.

When receiving an electronic key issue request from the mobile terminal 200, the electronic key issue unit 1021 issues an electronic key corresponding to the mobile terminal 200. As for the electronic key, an electronic key stored in advance may be acquired, or an electronic key may be dynamically generated. It is also possible to generate, for example, an electronic key that is effective only in a predetermined time zone, an electronic key for which the number of times of use is specified (for example, a one-time key and the like), an electronic key that can be used only in a predetermined mobile terminal 200 and the like.

Note that, when the mobile terminal 200 accesses a plurality of onboard apparatuses 300, the electronic key issue unit 1021 can issue a plurality of electronic keys for the target onboard apparatuses 300, respectively, to the mobile terminal 200.

The invalidation judgment unit 1022 presumes that the vehicle has left the owner of a mobile terminal 200 based on use records of electronic keys and invalidates an electronic key used by the corresponding mobile terminal 200. A specific process will be described later.

A process of judging use records of electronic keys will be described.

In the present embodiment, the invalidation judgment unit 1022 judges use records of electronic keys based on record data transmitted from the mobile terminals 200.

Figure 3:
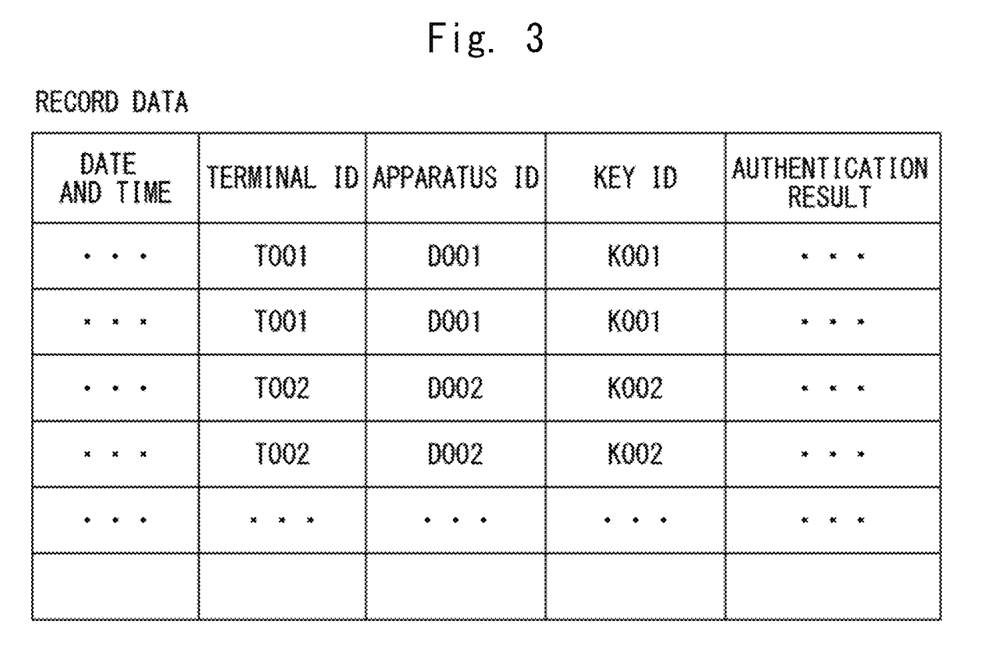
FIG. 3 is a diagram illustrating an example of record data generated by a server apparatus.

FIG. 3 is an example of the record data. Each piece of record data is data indicating a record of an onboard apparatus 300 having authenticated a mobile terminal 200. The piece of record data is data in which a date and time, an identifier of the mobile terminal 200 (a terminal ID), an identifier of the onboard apparatus 300 (an apparatus ID) and an identifier of a used electronic key (a key ID) are mutually associated. Note that the piece of record data may include an authentication result (success or failure, an error code or the like in the case of failure).

The storage 103 is means for storing information and configured with a storage medium such as a RAM, a magnetic disk and a flash memory. In the storage 103, various kinds of programs executed by the controller 102, data and the like are stored. Further, in the storage 103, various kinds of data for generating an electronic key (authentication-related data), the record data described above, and the like are stored.

Next, each mobile terminal 200 will be described.

The mobile terminal 200 is a small-size computer, for example, a smartphone, a mobile phone, a tablet terminal, a personal information terminal or a wearable computer (such as a smartwatch). The mobile terminal 200 is configured, including a communication unit 201, a controller 202, a storage 203, a near-field communication unit 204 and an input/output unit 205.

The communication unit 201 is a communication interface for performing communication with the server apparatus 100 via the network similarly to the communication unit 101.

The controller 202 is means for controlling the mobile terminal 200. The controller 202 is configured, for example, with a microcomputer. The controller 202 may realize these functions by executing a program stored in the storage 203 described later by the CPU.

The controller 202 includes an authentication request unit 2021 and a record data generation unit 2022 as functional modules. Each of the functional modules may be realized by executing a program stored in storage means (the ROM or the like) by the CPU.

The authentication request unit 2021 executes a process of acquiring an electronic key from the server apparatus 100 and a process of performing communication with the onboard apparatus 300 to request locking/unlocking.

The authentication request unit 2021 executes the process of acquiring an electronic key first. In the present embodiment, the server apparatus 100 generates key data including an electronic key in response to a request of the mobile terminal 200 and transmits the key data to the mobile terminal 200 via the communication unit 101.

Second, the authentication request unit 2021 generates a request to perform locking or unlocking, based on an operation performed by a user, and transmits the request to the onboard apparatus 300. For example, the authentication request unit 2021 outputs an interface screen for performing locking/unlocking on the input/output unit 205 (a touch panel display or the like) described later, generates data requesting locking or unlocking (a locking/unlocking request) based on an operation performed by the user, and transmits the data to the onboard apparatus 300.

Note that the operations performed by the user are not limited to operations performed via the touch panel display. For example, the operations may be operations performed by a hardware switch or the like.

Note that, when the mobile terminal 200 does not include an electronic key, it is impossible to perform a locking operation and an unlocking operation from the operation screen.

The electronic key that the mobile terminal 200 acquires may be a fixed key or may be a one-time key. In both cases, authentication information corresponding to the electronic key is stored in the onboard apparatus 300 in advance.

When authentication by the onboard apparatus 300 is successful, and locking/unlocking is executed, the record data generation unit 2022 performs a process of generating data indicating a record of having performed locking/unlocking (record data), and transmitting the data to the server apparatus 100.

The storage 203 is means for storing information and configured with a storage medium such as a RAM, a magnetic disk and a flash memory. In the storage 203, the key data transmitted from the server apparatus 100, the record data generated by the record data generation unit 2022, various kinds of programs executed by the controller 202, data and the like are stored.

The near-field communication unit 204 is an interface for performing near-field wireless communication with the onboard apparatus 300. The near-field communication unit 204 performs communication at a near distance (about several cm) using a predetermined wireless communication standard.

In the present embodiment, the near-field communication unit 204 performs data communication by the NFC standard (Near Field Communication). Note that, though NFC is indicated as an example in the present embodiment, other wireless communication standards are also available. For example, Bluetooth (registered trademark), UWE (Ultra Wideband), Wi-Fi (registered trademark) and the like are also available.

The input/output unit 205 is means for accepting an input operation performed by the user and presenting information to the user. Specifically, the input/output unit 205 is configured with a touch panel and control means therefor, and a liquid crystal display and control means therefor. In the present embodiment, the touch panel and the liquid crystal display are configured with one touch panel display.

Next, the onboard apparatus 300 will be described.

The onboard apparatus 300 includes a function of performing near-field wireless communication with a mobile terminal 200 to authenticate the mobile terminal 200 and a function of locking/unlocking an electronic lock based on a result of authenticating the mobile terminal 200. The onboard apparatus 300 is configured, including a communication unit 301, a controller 302, a storage 303 and a near-field communication unit 304.

The communication unit 301 is means for performing communication with the server apparatus 100 with the same communication standard as the communication unit 101.

The near-field communication unit 304 is means for performing communication with the mobile terminal 200 with the same communication standard as the near-field communication unit 204.

The controller 302 is a module that performs control to perform near-field wireless communication with the mobile terminal 200 via the near-field communication unit 304 to authenticate the mobile terminal 200 and control to perform locking/unlocking of the electronic lock based on a result of the authentication. The controller 302 is configured, for example, with a microcomputer.

The controller 302 includes an authentication unit 3021 and a key control unit 3022 as functional modules. Each of the functional modules may be realized by executing a program stored in storage means (the ROM or the like) by the CPU.

The authentication unit 3021 performs authentication of the mobile terminal 200 based on an electronic key transmitted from the mobile terminal 200. Specifically, the authentication unit 3021 compares authentication information stored in the storage 303 in advance with the electronic key transmitted from the mobile terminal 200, and judges that the authentication is successful when the authentication information and the electronic key match with each other. When the authentication information and the electronic key do not match with each other, the authentication unit 3021 judges that the authentication has failed. When the authentication unit 3021 succeeds in the authentication of the mobile terminal 200, an instruction for performing locking/unlocking is transmitted to the key control unit 3022 described later.

A method for the authentication performed by the authentication unit 3021 may be a method of simply comparing pieces of authentication information to verify sameness between them or may be a method using asymmetric cryptography.

The key control unit 3022 controls the electronic lock (latch) based on the instruction transmitted from the authentication unit 3021.

The storage 303 is means for storing information and configured with a storage medium such as a RAM, a magnetic disk and a flash memory. In the storage 303, the authentication information to be compared with the electronic key transmitted from the mobile terminal 200, various kinds of programs executed by the controller 302, data and the like are stored.

Figure 4:
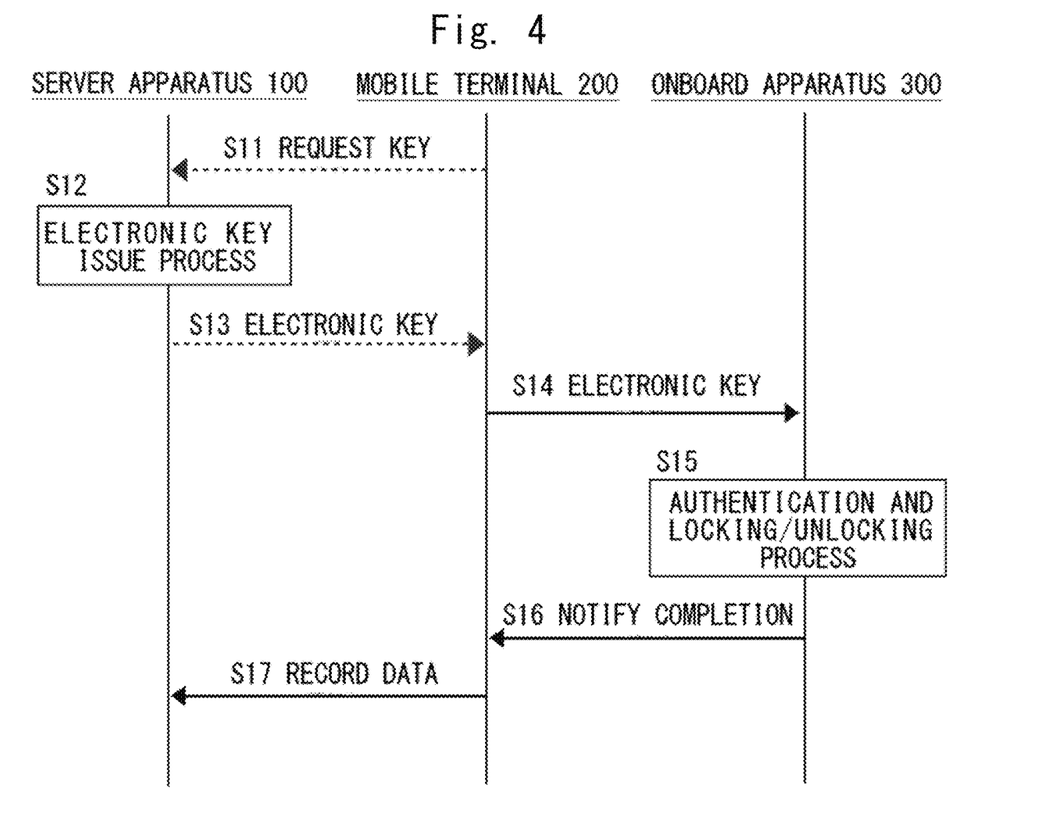
FIG. 4 is a flow diagram of data transmitted/received among the components.

Next, a process at the time of the user locking/unlocking the vehicle will be described. FIG. 4 is a flow diagram of data transmitted/received among the components.

First, the mobile terminal 200 transmits data requesting issue of an electronic key (a key request) to the server apparatus 100 (step S11). At this step, the following pieces of information are transmitted at the same time:

(1) the key request;
(2) the identifier of the mobile terminal 200; and
(3) data for proving authenticity of the mobile terminal 200.

The data for proving the authenticity of the mobile terminal 200 may be a password or may be biological information. Further, what is obtained by hashing these pieces of information is also possible.

After authenticating the mobile terminal 200 at step S12, the electronic key issue unit 1021 generates or acquires an electronic key specific to the mobile terminal 200 and transmits the electronic key to the mobile terminal 200 (step S13).

When the user of the mobile terminal 200 performs an operation of accessing the onboard apparatus 300 via the input/output unit 205, the mobile terminal 200 (the authentication request unit 2021) transmits the electronic key to the onboard apparatus 300 (step S14). At this time, data requesting a specific process (for example, locking or unlocking) (a locking/unlocking request) may be transmitted at the same time.

At step S15, the onboard apparatus 300 (the authentication unit 3021) compares the electronic key transmitted from the mobile terminal 200 with the authentication information stored in advance to perform an authentication process. Further, when the authentication is successful, the requested process (the locking/unlocking process) is executed. For example, the key control unit 3022 controls the electronic lock to perform locking or unlocking.

After locking or unlocking is completed, the key control unit 3022 that the onboard apparatus 300 transmits a notification to the effect that the process has been completed (a completion notification) to the mobile terminal 200 (step S16). Thereby, the notification to the effect that the locking or unlocking has been completed is outputted onto a touch panel screen of the mobile terminal 200. Note that, when the terminal authentication information is a one-time key, the one-time key may be invalidated at this timing.

At step S17, the mobile terminal 200 generates data including the identifier of itself, the identifier of the onboard apparatus 300 and the identifier of the electronic key (record data) and transmits the record data to the server apparatus 100. The record data is data indicating a record of the mobile terminal 200 having been authenticated by the onboard apparatus 300. The server apparatus 100 (the invalidation judgment unit 1022) stores the received record data into the storage 103. In the record data, data indicating an action (locking or unlocking) performed for the onboard apparatus 300 may be included.

Figure 5:
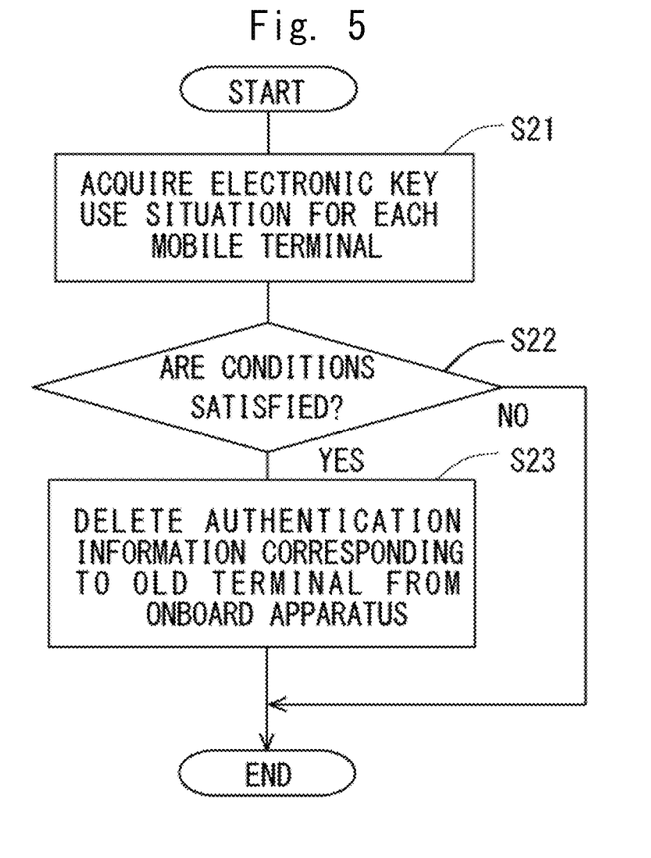
FIG. 5 is a flowchart of an invalidation process performed by the server apparatus in the first embodiment.

Next, a process of the server apparatus 100 invalidating an electronic key will be described. FIG. 5 is a flowchart of a process that the server apparatus 100 (the invalidation judgment unit 1022) performs. The process is executed in a predetermined cycle.

Figure 6:
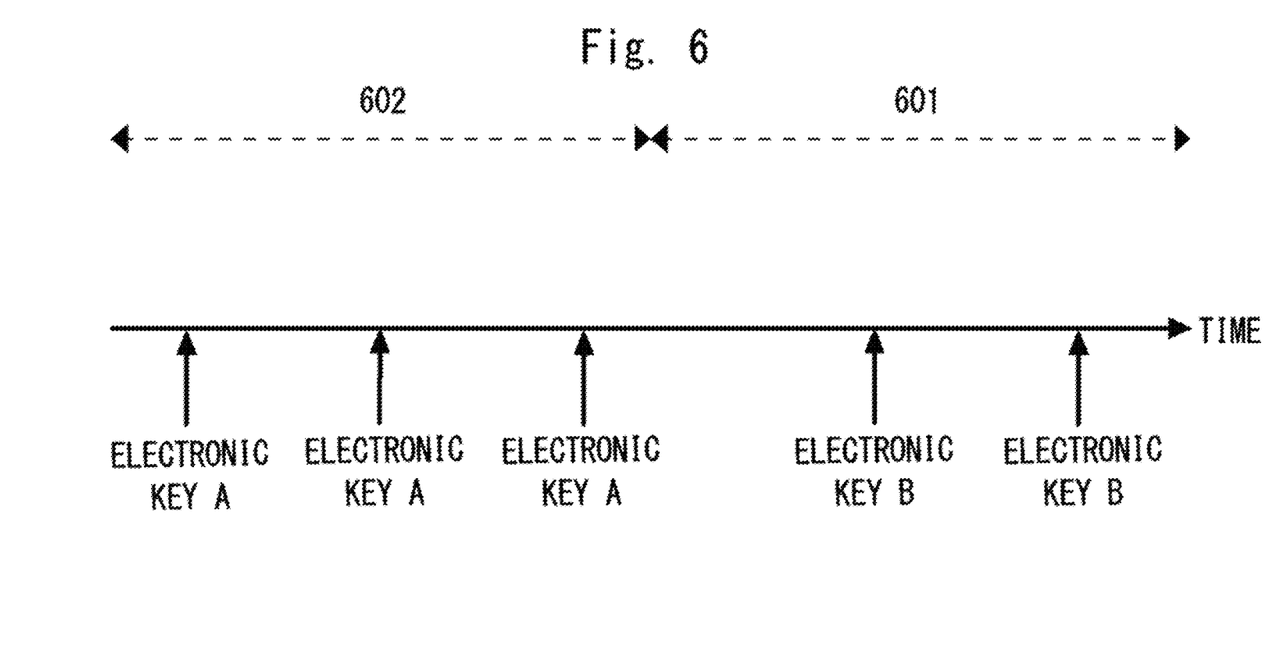
FIG. 6 is a diagram illustrating conditions for performing the invalidation process.

First, at step S21, electronic key use situations are acquired based on stored record data. Thereby, as illustrated in FIG. 6, a history of use of electronic keys is acquired in time series.

Next, at step S22, it is judged whether the electronic key use situations satisfy predetermined conditions or not. At this step, when there is a pair of electronic keys satisfying the following conditions, it is judged that a mobile terminal used for locking/unlocking of the vehicle has been changed.

(Condition 1) An electronic key A has not been used in a first period (reference numeral 601) in the past starting from the present.
(Condition 2) An electronic key B was used in the first period.
(Condition 3) The electronic key A was used in a second period (reference numeral 602) before the first period.
(Condition 4) The electronic key B was not used in the second period.

In the present example, it is judged that a mobile terminal using the electronic key A is the old terminal, and a mobile terminal using the electronic key B is the new terminal. In other words, it is judged What the electronic key A is to be invalidated.

The lengths of the first and second periods can be design values, and it is preferable that the periods are reasonable periods for judging invalidation of an electronic key (for example, weekly or monthly).

The first and second periods may not be consecutive. For example, since there is a possibility that a period in which the two electronic keys are mixedly used occurs, the first and second periods may be separated to some extent (for example, by one day).

When a positive judgment is made at step S22, the server apparatus 100 performs communication with the onboard apparatus 300, and causes authentication information associated with the electronic key used by the old terminal to be deleted from the onboard apparatus 300 (step S23).

According to the process described above, when an electronic key associated with a certain mobile terminal has not been used in a predetermined period, the electronic key can be automatically invalidated. Furthermore, since the invalidation process is performed on condition that a used electronic key is different before and after a predetermined timing, it can be appropriately judged that the owner of a vehicle has changed.

Note that, though the four Conditions 1 to 4 are indicated as an example in the description of the present embodiment, it is not necessarily required to use all these four together. For example, the judgment may be made by "only Condition 1" or "only Conditions 1 and 2".

Second Embodiment

In the first embodiment, different electronic keys are issued to a plurality of mobile terminals 200, respectively, and a use situation of each electronic key is judged. In comparison, the second embodiment is an embodiment in which the same electronic key is issued to a plurality of mobile terminals 200, and a use situation of each mobile terminal 200 is judged.

In the second embodiment, not use situations of electronic keys but use situations of the mobile terminals 200 are acquired at step S21, and a condition judgment is performed for each mobile terminal at step S22. For example, when only the mobile terminal 200B is used in the period indicated by reference numeral 601 in FIG. 6, and only the mobile terminal 200A is used in the period indicated by reference numeral 602, it can be judged that the mobile terminal 200A is an old terminal, and the mobile terminal 200B is a new terminal.

In this case, a process of prohibiting access to the onboard apparatus 300 by the mobile terminal 200A is performed. For example, the invalidation judgment unit 1022 transmits information specific to the mobile terminal 200A (for example, a hardware identifier, a physical network address and the like) to the authentication unit 3021 to instruct the authentication unit 3021 to refuse connection or authentication for the mobile terminal 200A.

According to the second embodiment, even when a plurality of mobile terminals 200 uses the same electronic key, authentication by an old terminal can be invalidated.

Note that, though the onboard apparatus 300 is caused to refuse connection or authentication for the mobile terminal 200A in the second embodiment, issue of an electronic key to the mobile terminal 200A itself may be stopped. When an electronic key is not permanent, authentication for the mobile terminal 200A can be also invalidated in this way.

Third Embodiment

A third embodiment is an embodiment in which it is judged that a base where a vehicle is operated (an operation base) has changed, based on position information about the vehicle, and a mobile terminal or an electronic key used at an old base is invalidated. The operation base is, for example, a place where a vehicle is stored in normal operation (for example, a parking lot at home).

In the third embodiment, each mobile terminal 200 (each record data generation unit 2022) is configured to be capable of acquiring position information. The position information can be acquired, for example, by a built-in GPS module. The record data generation unit 2022 attaches acquired position information to record data and transmits them to the server apparatus 100.

Figure 7:
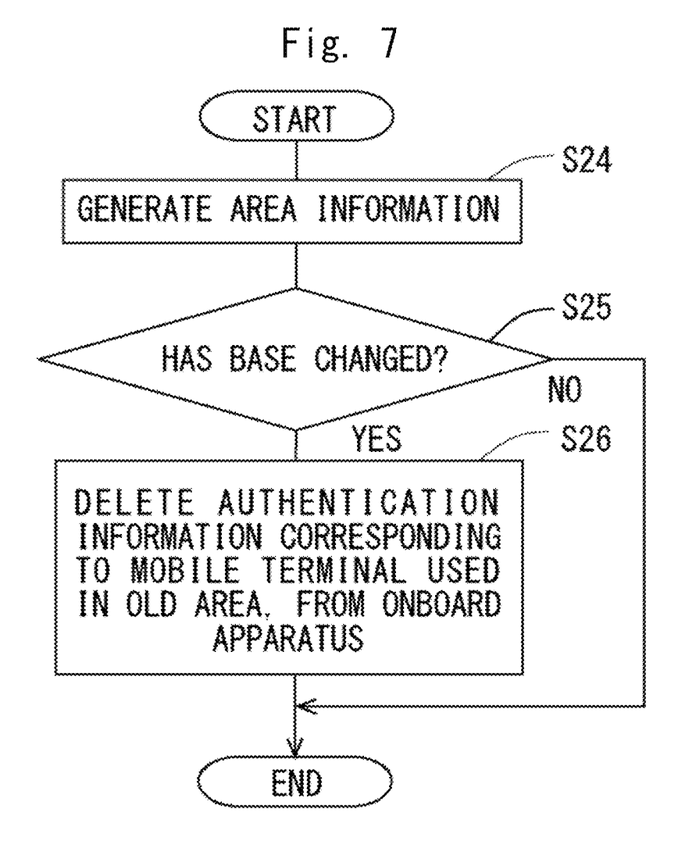
FIG. 7 is a flowchart of an invalidation process performed by the server apparatus in a third embodiment.

FIG. 7 is a flowchart of a process that the invalidation judgment unit 1022 performs in the third embodiment. The illustrated process is executed instead of the process illustrated in FIG. 5.

Figure 8:
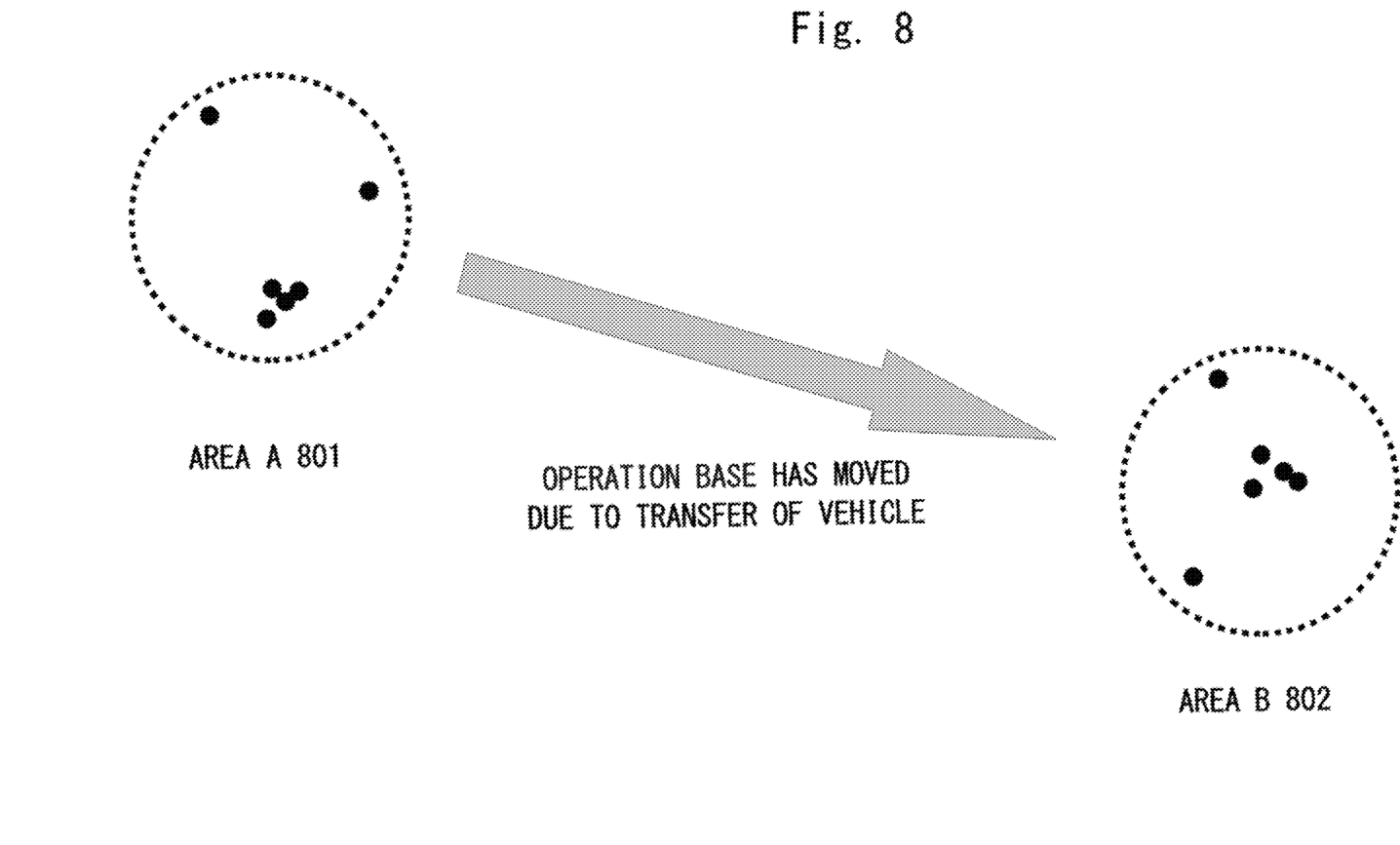
FIG. 8 is a diagram illustrating vehicle operation bases.

First, at step S24, area information indicating an area where an electronic key has been used is generated based on the record data. FIG. 8 is an example of the area information. Black points in FIG. 8 correspond to pieces of position information included in the record data. In other words, it is meant that the onboard apparatus 300 authenticated a mobile terminal 200 at the illustrated points.

Here, for example, a plurality of pieces of position information included in the record data is integrated to generate a cluster. The cluster generated here indicates an area where an electronic key has been used. For example, when the vehicle is transferred from a user A to a user B, area information including an area indicated by reference numeral 801 (assumed to be an area A) and an area indicated by reference numeral 802 (assumed to be an area B) is generated.

Then, at step 325, it is judged that the operation base of the vehicle has changed, based on the generated area. At this step, when there is a pair of areas satisfying the following conditions, it is judged that the operation base of the vehicle has changed from the area A to the area B.

(Condition 2-1) Authentication has not been performed in the area A in the first period (reference numeral 601).
(Condition 2-2) Authentication has been performed in the area B in the first period.
(Condition 2-3) Authentication was performed in the area A in the second period (reference numeral 602).
(Condition 2-4) Authentication was not performed in the area B in the second period.

When it is judged that the operation base has changed, authentication information corresponding to a mobile terminal used in an old area is deleted from the onboard apparatus 300. Specifically, the mobile terminal 200A that has been used in the area A and an electronic key used by the mobile terminal 200 are identified by referring to the record data, and authentication information corresponding to the electronic key is deleted from the onboard apparatus 300. Or alternatively, for the mobile terminal 200A that has been used in the old area, a measure for prohibiting access to the onboard apparatus 300 is taken.

According to the third embodiment, it is possible to judge that transfer of a vehicle has occurred, based on areas where electronic keys were used.

Note that even when the conditions (2-1) to (2-4) described before are satisfied, it is preferable not to perform the invalidation process when used mobile terminals are the same. For example, the electronic key invalidation process may not be performed, for example, when the mobile terminal 200B was used in the area A to some extent or when the mobile terminal 200A was used in area B to some extent. In such cases, it is conceivable that the user has moved to a new address.

At the process of step 324, an area unrelated to the operation base of the vehicle may be generated. For example, when the user frequently goes to a facility away from his home, an area including the facility may be generated. In such a case, filtering may be performed based on the frequency of the electronic key being used. For example, as for an area where the frequency of the electronic key having been used in a certain period is equal to or below a predetermined value (for example, once a week or less often), the area may be judged not to be an operation base and deleted.

(Modification of Third Embodiment)

Though, in the third embodiment, an operation base of a vehicle is judged based on records of use of electronic keys, the operation base of the vehicle may be judged only based on position information about the vehicle.

For example, the onboard apparatus 300 is caused to include a function of acquiring position information and transmitting the position information to the server apparatus 100 at a predetermined timing. The predetermined timing may be, for example, a periodic timing or may be a timing when a vehicle is unlocked, a timing when the ignition is turned on, and the like.

Then, the server apparatus 100 stores the acquired position information in association with the vehicle. A method for generating area information using accumulated position information is similar to the method of the third embodiment.

It is also possible to judge that an operation base of a vehicle has changed, by such a method.

(Modifications)

The above embodiments are mere examples, and the present disclosure can be appropriately changed and implemented within a range not departing from its spirit.

For example, the processes and means described in the present disclosure can be freely combined and implemented as far as technical contradiction does not occur.

Further, though the server apparatus 100 that issues an electronic key performs the invalidation process in the descriptions of the embodiments, the onboard apparatus 300 may perform the invalidation process. In this case, the controller 302 performs the function of the invalidation judgment unit 1022. Note that the controller 302 may acquire record data from a mobile terminal 200, or the controller 302 itself may generate the record data.

Further, though the onboard apparatus 300 is indicated as an example in the descriptions of the embodiments, an apparatus other than an apparatus mounted on a vehicle can be also used when the apparatus includes the function of authenticating a mobile terminal 200.

Further, though the server apparatus 100 receives record data from a mobile terminal 200 in the descriptions of the embodiments, a transmission source of the data may not be a mobile terminal 200 when it is possible to acquire data indicating that authentication has been performed with an electronic key. For example, the onboard apparatus 300 may generate and transmit the record data.

Further, a process described as being performed by one apparatus may be shared and executed by a plurality of apparatuses. Or alternatively, processes described as being performed by different apparatuses may be executed by one apparatus. What hardware configuration (server configuration) each function is realized by can be flexibly changed in a computer system.

The present disclosure can be realized by supplying a computer program in which the functions described in the above embodiments are implementer to a computer, and one or more processors that the computer includes reading out and executing the program. Such a computer program may be provided to the computer by a non-transitory computer-readable storage medium connectable to a system bus of the computer or may be provided to the computer via a network. The non-transitory computer-readable storage medium includes, for example, a disk of an arbitrary type such as a magnetic disk (a floppy (registered trademark) disk, a hard disk drive (HDD) and the like), an optical disk (a CD-ROM, a DVD disk, a Blu-ray disk and the like), and a read-only memory (ROM), a random access memory (RAM), an EPROM, an EEPROM, a magnetic card, a flash memory, an optical card, and a medium of an arbitrary type that is appropriate for storing electronic commands.

What is claimed is:

1. An information processing apparatus capable of communicating with a vehicle configured to perform authentication for a mobile apparatus based on an electronic key acquired from the mobile apparatus, the information processing apparatus comprising a controller including at least one processor configured to execute:
   acquiring use situations of electronic keys issued to two or more mobile apparatuses; and
   invalidating the authentication performed for at least a mobile apparatus associated with an old owner of the vehicle of the two or more mobile apparatuses when an ownership of the vehicle has been changed and the use situations satisfy predetermined conditions, and wherein
   the two or more mobile apparatuses include a first mobile apparatus and a second mobile apparatus; and
   the controller executes:
   when, in a past first period, there are no use records of a first electronic key issued to the first mobile apparatus and there is a use record of a second electronic key issued to the second mobile apparatus, and, in a second period before the first period, there is a use record of the first electronic key and there are no use records of the second electronic key, determining that the first mobile apparatus is a mobile apparatus associated with the old owner; and
   invalidating the first electronic key.

2. The information processing apparatus according to claim 1, wherein the controller invalidates the first electronic key by deleting authentication information corresponding to the first electronic key from the vehicle.

3. An information processing apparatus capable of communicating with a vehicle configured to perform authentication for a mobile apparatus based on an electronic key acquired from the mobile apparatus, the information processing apparatus comprising a controller including at least one processor configured to execute:
   acquiring use situations of electronic keys issued to two or more mobile apparatuses; and
   invalidating the authentication performed for at least a mobile apparatus associated with an old ownership of the vehicle of the two or more mobile apparatuses when an owner of the vehicle has been changed and the use situations satisfy predetermined conditions, and wherein
   the two or more mobile apparatuses include a first mobile apparatus and a second mobile apparatus; and
   when, in a past first period, there are no use records of the electronic key by the first mobile apparatus and there is a use record of the electronic key by the second mobile apparatus, and, in a second period before the first period, there is a use record of the electronic key by the first mobile apparatus and there are no use records of the electronic key by the second mobile apparatus, determining that the first mobile apparatus is a mobile apparatus associated with the old owner, and
   invalidating the authentication performed for the first mobile apparatus.

4. The information processing apparatus according to claim 3, wherein, when performing a process of issuing the electronic keys to the two or more mobile apparatuses and deciding to invalidate the authentication performed for the first mobile apparatus, the controller stops issue of the electronic key to the first mobile apparatus.

5. The information processing apparatus according to claim 3, wherein, when deciding to invalidate the authentication performed for the first mobile apparatus, the controller causes the vehicle to refuse access from the first mobile apparatus.

6. The information processing apparatus according to claim 1, wherein the controller invalidates the authentication on condition that consent is obtained from a user of the vehicle.

7. An information processing method implemented by an information processing apparatus capable of communicating with a vehicle configured to perform authentication for a mobile apparatus based on an electronic key acquired from the mobile apparatus, the information processing method comprising:
   acquiring use situations of electronic keys issued to two or more mobile apparatuses;

invalidating the authentication performed for at least a mobile apparatus associated with an old owner of the vehicle of the two or more mobile apparatuses when an ownership of the vehicle has been changed and the use situations satisfy predetermined conditions; and wherein the two or more mobile apparatuses include a first mobile apparatus and a second mobile apparatus; and the information processing method further comprising:

when, in a past first period, there are no use records of a first electronic key issued to the first mobile apparatus and there is a use record of a second electronic key issued to the second mobile apparatus, and, in a second period before the first period, there is a use record of the first electronic key and there are no use records of the second electronic key, determining that the first mobile apparatus is a mobile apparatus associated with the old owner; and invalidating the first electronic key.

8. An information processing method implemented by an information processing apparatus capable of communicating with a vehicle configured to perform authentication for a mobile apparatus based on an electronic key acquired from the mobile apparatus, the information processing method comprising:

acquiring use situations of electronic keys issued to two or more mobile apparatuses; and invalidating the authentication performed for at least a mobile apparatus associated with an old owner of the vehicle of the two or more mobile apparatuses when an ownership of the vehicle has been changed and the use situations satisfy predetermined conditions; and wherein the two or more mobile apparatuses include a first mobile apparatus and a second mobile apparatus; and the information processing method further comprising:

when, in a past first period, there are no use records of the electronic key by the first mobile apparatus and there is a use record of the electronic key by the second mobile apparatus, and, in a second period before the first period, there is a use record of the electronic key by the first mobile apparatus and there are no use records of the electronic key by the second mobile apparatus, determining that the first mobile apparatus is a mobile apparatus associated with the old owner; and invalidating the authentication performed for the first mobile apparatus.

9. The information processing method according to claim 7, wherein the authentication performed for a first mobile apparatus with a record of having been used in a first area is invalidated when it is judged that the operation base of the vehicle has moved from the first area to a second area.

10. The information processing method according to claim 7, wherein the authentication is invalidated on condition that consent is obtained from a user of the vehicle.

11. A non-transitory storage medium storing a program for causing a computer to execute the information processing method according to claim 7.

* * * * *